(12) United States Patent
Nagata et al.

(10) Patent No.: US 12,354,478 B2
(45) Date of Patent: Jul. 8, 2025

(54) METHOD OF DETERMINING THE TOTAL POWER REQUIRED TO CHARGE MULTIPLE VEHICLES

(71) Applicant: TOYOTA JIDOSHA KABUSHIKI KAISHA, Toyota (JP)

(72) Inventors: Yu Nagata, Chofu (JP); Toshihiro Nakamura, Shizuoka-ken (JP)

(73) Assignee: TOYOTA JIDOSHA KABUSHIKA KAISHA, Toyota (JP)

( * ) Notice: Subject to any disclaimer, the term of this patent is extended or adjusted under 35 U.S.C. 154(b) by 81 days.

(21) Appl. No.: 18/460,585

(22) Filed: Sep. 4, 2023

(65) Prior Publication Data
US 2024/0087456 A1 Mar. 14, 2024

(30) Foreign Application Priority Data
Sep. 13, 2022 (JP) .................................. 2022-145654

(51) Int. Cl.
  *G08G 1/14* (2006.01)
  *B60L 53/63* (2019.01)
  *B60L 58/13* (2019.01)

(52) U.S. Cl.
  CPC ............. *G08G 1/148* (2013.01); *B60L 53/63* (2019.02); *B60L 58/13* (2019.02); *B60L 2260/54* (2013.01)

(58) Field of Classification Search
None
See application file for complete search history.

(56) References Cited

U.S. PATENT DOCUMENTS

| | | | |
|---|---|---|---|
| 11,447,024 B1* | 9/2022 | Brannan | B60L 58/12 |
| 12,221,004 B2* | 2/2025 | Kim | B60L 53/68 |
| 2014/0028254 A1 | 1/2014 | Shane et al. | |
| 2016/0357654 A1* | 12/2016 | de la Cropte De Chantérac | G06F 11/327 |
| 2021/0221243 A1* | 7/2021 | Kawamoto | G06Q 50/06 |
| 2021/0331603 A1* | 10/2021 | Brombach | B60L 53/67 |
| 2022/0080852 A1* | 3/2022 | Yu | H02J 7/00034 |
| 2022/0188710 A1* | 6/2022 | Nagata | G06Q 10/02 |
| 2022/0266716 A1* | 8/2022 | Kim | B60L 50/61 |
| 2022/0305942 A1* | 9/2022 | Mannepalli | B60L 53/68 |
| 2022/0348105 A1* | 11/2022 | Sujan | B60L 53/62 |
| 2023/0398895 A1* | 12/2023 | Lu | B60L 53/63 |

FOREIGN PATENT DOCUMENTS

| | | | | |
|---|---|---|---|---|
| CN | 106828126 A | * | 6/2017 | ............. B60L 50/40 |
| CN | 115411717 A | * | 11/2022 | |
| CN | 116706279 A | * | 9/2023 | |

(Continued)

*Primary Examiner* — Fekadeselassie Girma
(74) *Attorney, Agent, or Firm* — KENJA IP LAW PC

(57) ABSTRACT

A method performed by an information processing apparatus, the method includes, for each of a plurality of vehicles for which charging in a target time period has been applied for, acquiring vehicle information including predicted remaining SOC to be remaining at a start of the target time period and/or predicted consumed SOC to be consumed in a vehicle use period after an end of the target time period, determining, based on the vehicle information, whether each of the plurality of vehicles is a target for charging in the target time period, and determining a charging plan to charge a vehicle being determined to be eligible for charging, among the plurality of vehicles, in the target time period.

3 Claims, 3 Drawing Sheets

(56) References Cited

FOREIGN PATENT DOCUMENTS

| | | | |
|---|---|---|---|
| JP | 2015186391 A | 10/2015 | |
| JP | 2021191044 A | 12/2021 | |
| JP | 2022118575 A * | 8/2022 | |
| WO | WO-2023283078 A1 * | 1/2023 | ................ H02J 3/14 |

* cited by examiner

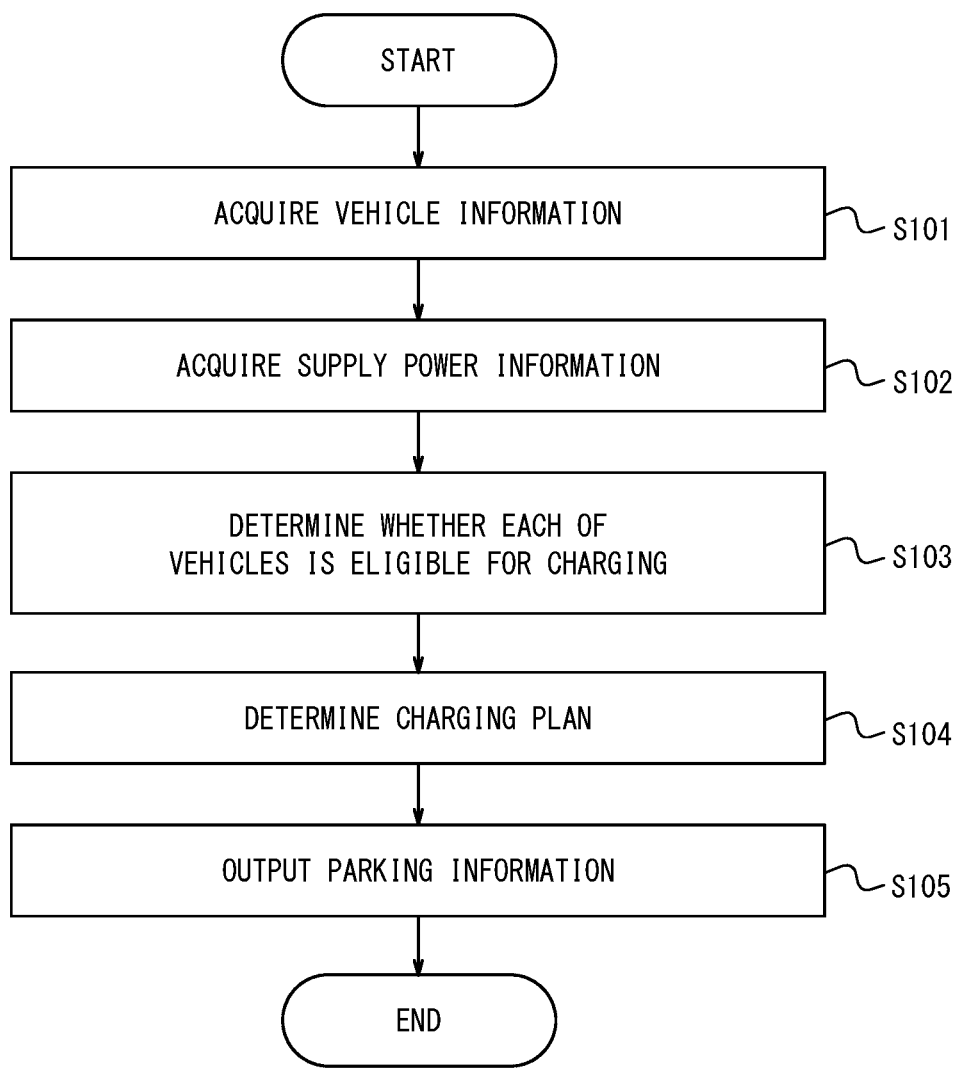

METHOD OF DETERMINING THE TOTAL POWER REQUIRED TO CHARGE MULTIPLE VEHICLES

CROSS-REFERENCE TO RELATED APPLICATION

This application claims priority to Japanese Patent Application No. 2022-145654 filed on Sep. 13, 2022, the entire contents of which are incorporated herein by reference.

TECHNICAL FIELD

The present disclosure relates to a method.

BACKGROUND

Technology related to charging of vehicles is known. For example, Patent Literature (PTL) 1 discloses technology that supplies discharged power from at least one vehicle as charging power to at least one other vehicle when it is determined that total power required to charge multiple vehicles is greater than commercial power available from a commercial power source.

CITATION LIST

Patent Literature

PTL 1: JP 2015-186391 A

SUMMARY

There is room for improvement with respect to technology related to charging of vehicles.

It would be helpful to improve technology related to charging of vehicles.

A method according to an embodiment of the present disclosure is a method performed by an information processing apparatus, the method including:

for each of a plurality of vehicles for which charging in a target time period has been applied for, acquiring vehicle information including predicted remaining SOC to be remaining at a start of the target time period and/or predicted consumed SOC to be consumed in a vehicle use period after an end of the target time period;

determining, based on the vehicle information, whether each of the plurality of vehicles is eligible for charging in the target time period; and determining a charging plan to charge a vehicle being determined to be eligible for charging, among the plurality of vehicles, in the target time period.

According to an embodiment of the present disclosure, technology related to charging of vehicles is improved.

BRIEF DESCRIPTION OF THE DRAWINGS

In the accompanying drawings:

FIG. 4 is a flowchart illustrating operations of the information processing apparatus.

DETAILED DESCRIPTION

Hereinafter, an embodiment of the present disclosure will be described.

Outline of Embodiment

Figure 1:
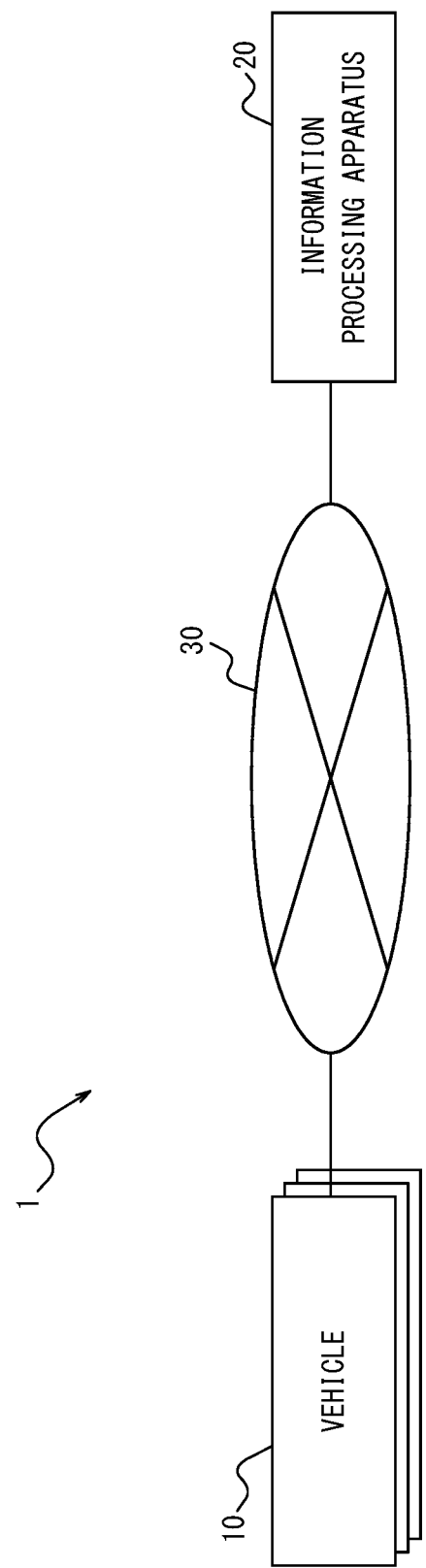
FIG. 1 is a block diagram illustrating a schematic configuration of a system according to an embodiment of the present disclosure.

An outline of a system 1 according to an embodiment of the present disclosure will be described with reference to FIG. 1. The system 1 includes vehicles 10 and an information processing apparatus 20. The vehicles 10 and the information processing apparatus 20 are communicably connected to a network 30 including, for example, the Internet, a mobile communication network, or the like.

The vehicles 10 are automobiles, for example, but are not limited to these, and may be any appropriate vehicles. Each of the automobiles is, for example, a Battery Electric Vehicle (BEV), a Hybrid Electric Vehicle (HEV), a Plug-in Hybrid Electric Vehicle (PHEV), a Fuel Cell Electric Vehicle (FCEV), or the like, but is not limited to these. The number of vehicles 10 provided in the system 1 may be freely determined.

In the present embodiment, the vehicles 10 each have the function (hereinafter referred to as "charging function") of charging power supplied under the control of a power management apparatus. The power management apparatus is an apparatus that manages power to be used in a facility, and can be, for example, an apparatus included in a system that realizes CITY-OS. The power is supplied by a power supply facility. The power supply facility can include a commercial power source, a renewable energy source, a storage battery, and the like. The storage battery may, for example, be located anywhere in an area (e.g., town) managed by the information processing apparatus 20.

The information processing apparatus 20 is, for example, a computer such as a server apparatus. The information processing apparatus 20 can communicate with the vehicles 10 via the network 30.

First, an outline of the present embodiment will be described, and details thereof will be described later. The information processing apparatus 20 acquires, for each of a plurality of vehicles for which charging in a target time period has been applied for, vehicle information including predicted remaining state of charge (SOC) to be remaining at a start of the target time period and/or predicted consumed SOC to be consumed in a vehicle use period after an end of the target time period. The vehicle use period is a period during which the vehicle is expected to be used after an end of charging or parking. A start of the vehicle use period may coincide with or differ from the end of the target time period. Any method can be employed to identify the vehicle use period. For example, the information processing apparatus 20 may receive schedule information from a vehicle or a terminal apparatus of a vehicle user to identify the vehicle use period based on the schedule information. The information processing apparatus 20 then determines, based on the vehicle information, whether each of the plurality of vehicles is eligible for charging in the target time period. The information processing apparatus 20 then determines a charging plan to charge vehicles that are determined to be eligible for charging, among the plurality of vehicles, in the target time period.

Thus, according to the present embodiment, the information processing apparatus 20 determines whether each of the plurality of vehicles 10 is eligible for charging in a target time period, based on vehicle information including predicted remaining SOC and/or predicted consumed SOC. Thus, for example, vehicles 10 with severe power shortage can be preferentially determined to be eligible for charging. Thus, technology related to charging of the vehicles 10 is improved in that power can be supplied appropriately while suppressing the supply of power.

Next, configurations of the system 1 will be described in detail.

(Configuration of Vehicle)

Figure 2:
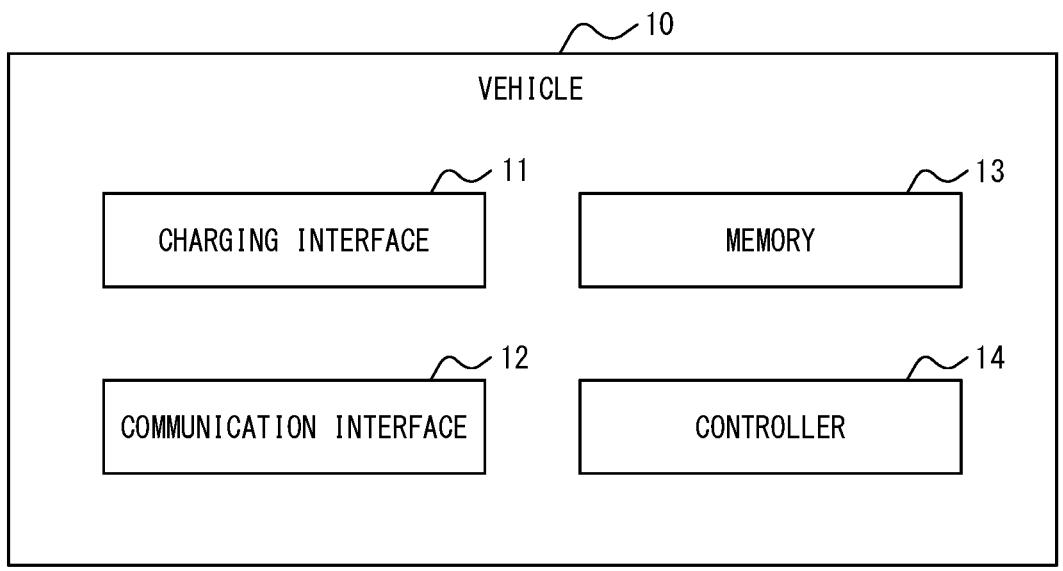
FIG. 2 is a block diagram illustrating a schematic configuration of a vehicle.

As illustrated in FIG. 2, each vehicle 10 includes a charging interface 11, a communication interface 12, a memory 13, and a controller 14.

The charging interface 11 includes a converter that converts power from a power supply facility into power to charge a vehicle power source such as an alternator, battery, or fuel cell installed in the vehicle 10, and a dedicated or general purpose power plug that can be inserted into an outlet of a charging facility to supply power from the power supply facility. The vehicle 10 includes the charging interface 11, which provides a charging function to charge power supplied from the power supply facility.

The communication interface 12 includes at least one interface for communication for connecting to the network 30. The communication interface is compliant with mobile communication standards such as the 4th generation (4G) standard or the 5th generation (5G) standard, for example, but these examples are not limiting. In the present embodiment, the vehicle 10 communicates with the information processing apparatus 20 via the communication interface 12 and the network 30.

The memory 13 includes one or more memories. The memories are semiconductor memories, magnetic memories, optical memories, or the like, for example, but are not limited to these. The memories included in the memory 13 may each function as, for example, a main memory, an auxiliary memory, or a cache memory. The memory 13 stores any information to be used for operations of the vehicle 10. For example, the memory 13 may store a system program, an application program, embedded software, and the like. The information stored in the memory 13 may be updated with, for example, information acquired from the network 30 via the communication interface 12.

The controller 14 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 14 controls the operations of the entire vehicle 10.

(Configuration of Information Processing Apparatus)

Figure 3:
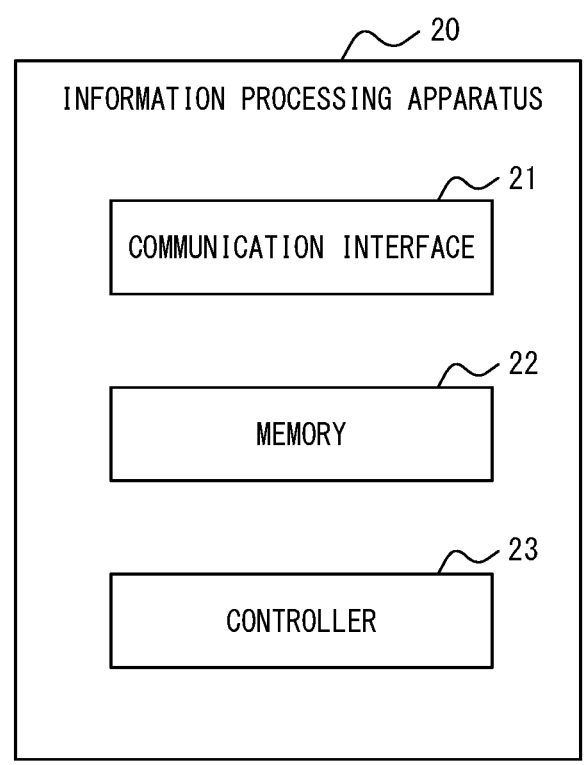
FIG. 3 is a block diagram illustrating a schematic configuration of an information processing apparatus.

As illustrated in FIG. 3, the information processing apparatus 20 includes a communication interface 21, a memory 22, and a controller 23. The communication interface 21 includes at least one communication interface for connecting to the network 30. The communication interface may be compliant with, for example, mobile communication standards, wired local area network (LAN) standards, or wireless LAN standards, but these examples are not limiting. The communication interface may be compliant with any appropriate communication standards. In the present embodiment, the information processing apparatus 20 communicates with the vehicle 10 via the communication interface 21 and the network 30.

The memory 22 includes one or more memories. The memories included in the memory 22 may each function as, for example, a main memory, an auxiliary memory, or a cache memory. The memory 22 stores any information to be used for operations of the information processing apparatus 20. For example, the memory 22 may store a system program, an application program, a database, map information, and the like. The information stored in the memory 22 may be updated with, for example, information acquired from the network 30 via the communication interface 21.

The controller 23 includes at least one processor, at least one programmable circuit, at least one dedicated circuit, or a combination of these. The controller 23 controls the operations of the entire information processing apparatus 20.

(Flow of Operations of Information Processing Apparatus)

Operations of the information processing apparatus 20 according to the present embodiment will be described with reference to FIG. 4.

Step S101: The controller 23 of the information processing apparatus 20 acquires, for each of a plurality of vehicles 10 for which charging in a target time period is applied for, vehicle information including predicted remaining SOC to be remaining at a start of the target time period and/or predicted consumed SOC to be consumed in a vehicle use period after an end of the target time period.

The target time period can be any predetermined time period. Multiple target time periods may be included in an established period. The established period may be any period, for example, one day. When the established period is one day, the target time period is, for example, a time period (e.g., from 15:00 to 15:30) to be targeted, of time periods of the 48 divisions of the day. In addition, any method can be employed to apply for charging in the target time period. For example, a user of each vehicle 10 may apply for charging by transmitting information at least identifying the vehicle 10 from any information terminal to the information processing apparatus 20. The controller 14 of each vehicle 10 may apply for charging by transmitting information identifying the vehicle 10 to the information processing apparatus 20, at least according to the predicted remaining SOC. Charging of a vehicle 10 is performed using a charging facility provided in a parking space at which the vehicle 10 is parked. Therefore, an application for charging may include an application for parking.

Any method can be employed to acquire the vehicle information. For example, the controller 23 may receive the vehicle information directly from each vehicle 10 via the communication interface 21 and the network 30, or may receive the vehicle information from an external apparatus that has acquired the vehicle information.

Step S102: The controller 23 acquires supply power information including supply electrical energy W capable of being supplied by a power supply facility for charging vehicles 10 in the target time period.

As described above, the power supply facility can include a commercial power source, a renewable energy source, a storage battery, and the like. Thus, the supply electrical energy W can be the sum of commercial supply electrical energy $W_1$ to be supplied by the commercial power source, predicted electrical energy $W_2$ predicted to be supplied by the renewable energy source, and storage battery supply electrical energy $W_3$ to be supplied by the storage battery, which are multiplied by coefficients a, b, and c, respectively (see Equation (1)). Each of the coefficients a, b, and c is 0 or more and 1 or less.

$$W = aW1 + bW2 + cW3 \quad (1)$$

The commercial supply electrical energy W1 to be supplied by the commercial power source may be determined based on a method for determining an electricity rate. For example, when the electricity rate is determined according to contract power that is the largest value among maximum power demand (the largest monthly value of an average power used per 30 minutes) for each month in the past year including the current month, the commercial supply electrical energy W1 per 30 minutes included in the target time period may be set so as not to exceed the contract power. This allows the information processing apparatus 20 to save cost required for the commercial supply electrical energy W1.

In Equation (1), the lower the prediction accuracy of the predicted electrical energy W2, the smaller the coefficient b may be set. This reduces the risk of occurrence of a situation in which a deviation of electrical energy supplied by the renewable energy source from the predicted electrical energy W2 hinders charging of vehicles 10 that are determined to be eligible for charging.

Step S103: The controller 23 determines, based on the vehicle information acquired in step S101, whether each of the plurality of vehicles 10 is eligible for charging in the target time period.

As a first example, the controller 23 may determine whether charging electrical energy required to bring the predicted remaining SOC of all the plurality of vehicles 10 to a predetermined charged state is less than or equal to the supply electrical energy W. The predetermined charged state is a charged state in which each vehicle 10 is expected to be able to travel continuously with taking into account a normal charging frequency of the vehicle 10. The predetermined charged state may be, for example, a fully charged state, or a state in which a predetermined percentage (for example, 90%) of the fully charged state is charged. Therefore, when the supply electrical energy W is sufficient, the information processing apparatus 20 can determine all the vehicles 10 that have applied for charging to be eligible for charging, thus improving user convenience.

As a second example, the controller 23 may determine vehicles 10 whose predicted consumed SOC is greater than or equal to a first threshold, among the plurality of vehicles 10, as first candidates for charging. When a predetermined condition based on the vehicle information on the vehicles 10 as the first candidates is satisfied, the controller 23 may further determine, among the first candidates, vehicles 10 whose values subtracting the predicted consumed SOC from the predicted remaining SOC is less than a second threshold, as second candidates for charging. When a predetermined condition based on the vehicle information on the vehicles 10 as the second candidates is satisfied, the controller 23 may further determine, among the second candidates, vehicles 10 whose time between a predetermined time in the target time period and a start time of the vehicle use period is less than a third threshold, as third candidates for charging.

More specifically as to the second example, upon determining the vehicles 10 whose predicted consumed SOC is greater than or equal to the first threshold (e.g., 0%), among the plurality of vehicles 10, as the first candidates for charging, the controller 23 determines whether the sum of required charging electrical energy for the respective vehicles 10 as the first candidates is greater than the supply electrical energy W. When it is determined that the sum of the required charging electrical energy for the respective vehicles 10 as the first candidates is less than or equal to the supply electrical energy W, the controller 23 determines that the vehicles 10 as the first candidates are eligible for charging. The required charging electrical energy may be, for example, charging electrical energy that brings the SOC of each of the vehicles 10 as the first candidates to a predetermined charged state, or charging electrical energy that makes the predicted remaining SOC of each of the vehicles 10 as the first candidates to be greater than or equal to the predicted consumed SOC.

When it is determined that the sum of the required charging electrical energy for the respective vehicles 10 as the first candidates is greater than the supply electrical energy W, the controller 23 determines, among the first candidates, vehicles 10 whose values subtracting the predicted consumed SOC from the predicted remaining SOC is less than a second threshold (e.g., 30%), as second candidates for charging. Upon determining the second candidates, the controller 23 determines whether the sum of required charging electrical energy for the respective vehicles 10 as the second candidates is greater than the supply electrical energy W. When it is determined that the sum of the required charging electrical energy for the respective vehicles 10 as the second candidates is less than or equal to the supply electrical energy W, the controller 23 determines that the vehicles 10 as the second candidates are eligible for charging.

When it is determined that the sum of the required charging electrical energy for the respective vehicles 10 as the second candidates is greater than the supply electrical energy W, the controller 23 determines, among the second candidates, vehicles 10 whose time between a predetermined time in the target time period and a start time of the vehicle use period is less than a third threshold (e.g., 12 hours), as third candidates for charging. The controller 23 determines whether the sum of required charging electrical energy for the respective vehicles 10 as the third candidates is less than or equal to the supply electrical energy W. When it is determined that the sum is less than or equal to the supply electrical energy W, the controller 23 determines that the third candidates are eligible for charging.

Thus, the information processing apparatus 20 can determine which vehicles 10 to charge according to a priority level as follows: vehicles 10 with low predicted consumed SOC have the lowest priority, vehicles 10 with high values subtracting the predicted consumed SOC from the predicted remaining SOC have the next lowest priority, and vehicles 10 with long time between a predetermined time in the target time period and a start time of the vehicle use period have the next lowest priority. Therefore, the information processing apparatus 20 preferentially determines vehicles 10 with sever power shortage to be eligible for charging, so power can be supplied appropriately.

Step S104: The controller 23 determines a charging plan to charge the vehicles 10 that are determined to be eligible for charging, among the plurality of vehicles 10, in the target time period.

The charging plan is a plan regarding charging of the vehicles 10 that are determined to be eligible for charging in the target time period. The charging plan includes, for example, the amount of charge for each of the vehicles 10 and a parking space equipped with a charging facility in which each of the vehicles 10 is to park for charging. The controller 23 may determine a parking space with a charging facility in which each of the plurality of vehicles 10 that are determined to be eligible for charging is to park in the target time period.

For example, the vehicle information may further include the location of the vehicle 10. In such a configuration, the controller 23 may determine parking spaces in which the respective vehicles 10 are to park, based on the locations of the respective vehicles 10 and the locations of the respective parking spaces.

Specifically, the location of a vehicle 10 may be a location (departure location) at which the vehicle 10 has stayed before the start of the target time period. In such a configuration, the controller 23 may determine parking spaces in which the respective vehicles 10 are to park, based on the departure locations of the respective vehicles 10 and the locations of the respective parking spaces. Specifically, the controller 23 may determine the parking spaces in which the respective vehicles 10 are to park, so that the sum of distances the vehicles 10 travel from the respective departure locations to the parking spaces is the shortest.

Therefore, the information processing apparatus 20 can determine the charging plan so as to reduce electrical energy to be consumed by the vehicles 10 to move to the parking spaces. Thus, the information processing apparatus 20 can save electrical energy to charge the plurality of vehicles 10.

Step S105: The controller 23 outputs parking information indicating a parking space for each of the vehicles 10, included in the charging plan. Specifically, the controller 23 transmits, via the communication interface 21 to each of the vehicles 10 that are determined in step S103 to be eligible for charging, parking information indicating a parking space in which the vehicle 10 is to park. The parking information may, for example, be information identifying the parking space or information indicating the location of the parking space. The communication interface 12 of the vehicle 10 thereby receives the parking information, and the controller 14 of the vehicle 10 outputs the parking information via an output apparatus such as a display or speaker, for example.

The controller 23 may also transmit, to each of vehicles 10 that are determined in step S103 not to be eligible for charging, information indicating that the vehicle 10 is not eligible for charging. The communication interface 12 of the vehicle 10 thereby receives the information indicating that the vehicle 10 is not eligible for charging, and the controller 14 of the vehicle 10 outputs the information via an output apparatus such as a display or speaker, for example.

The memory 22 may store in advance information on a terminal apparatus used by a user or a user account of the user, in association with identification information of a vehicle 10. In such a configuration, the controller 23 may notify, via the communication interface 21, the terminal apparatus or user account of the parking information or information indicating that the vehicle 10 is not eligible for charging.

As described above, the information processing apparatus 20 according to the present embodiment acquires, for each of a plurality of vehicles 10 for which charging in a target time period has been applied for, vehicle information including predicted remaining SOC to be remaining at a start of the target time period and/or predicted consumed SOC to be consumed in a vehicle use period after an end of the target time period. The information processing apparatus 20 then determines, based on the vehicle information, whether each of the plurality of vehicles 10 is eligible for charging in the target time period. The information processing apparatus 20 then determines a charging plan to charge vehicles 10 that are determined to be eligible for charging, among the plurality of vehicles 10, in the target time period.

According to such a configuration, the information processing apparatus 20 determines, based on the vehicle information including the predicted remaining SOC and/or the predicted consumed SOC, whether each of the plurality of vehicles 10 is eligible for charging in the target time period. Thus, vehicles 10 with severe power shortage can be preferentially determined to be eligible for charging. Thus, technology related to charging of the vehicles 10 is improved in that power can be supplied appropriately while suppressing the supply of power.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which the configuration and operations of the information processing apparatus 20 in the above embodiment are distributed to multiple computers capable of communicating with each other can be implemented. For example, an embodiment in which some or all of the components of the information processing apparatus 20 are provided in the vehicles 10 can also be implemented. For example, a navigation apparatus mounted in each vehicle 10 may be equipped with some or all of the components of the information processing apparatus 20.

In the embodiment described above, each vehicle 10 may further include a power supply interface. The power supply interface includes an outlet into which a dedicated or general purpose power plug can be inserted in order to enable to supply power from a power source, such as an alternator, battery, or fuel cell installed in the vehicle 10. The vehicle 10 with the power supply interface has a power supply function that supplies power to other vehicles 10.

In such a configuration, as described above, the controller 23 of the information processing apparatus 20 acquires supply power information including supply electrical energy W capable of being supplied by a power supply facility for charging vehicles 10 in the target time period. The controller 23 determines whether charging electrical energy required to bring the predicted remaining SOC of all the plurality of vehicles 10 to a predetermined charged state is less than or equal to the supply electrical energy W. When it is determined that the charging electric energy is greater than the supply electrical energy W, the controller 23 determines, among vehicles 10 that are not determined to be eligible for charging in the target time period, a vehicle 10 whose value subtracting the predicted consumed SOC from the predicted remaining SOC is greater than a reference value (for example, 50%), as a power feeding vehicle. Here, it is determined that the charging electric energy is less than or equal to the supply electrical energy W, the controller 23 determines that none of the vehicles 10 that are not determined to be eligible for charging in the target time period are assigned as power feeding vehicles. Thus, the information processing apparatus 20 can make the vehicle 10 with the sufficient predicted remaining SOC, relative to the predicted consumed SOC, supply power to a vehicle 10 with the predicted remaining SOC that is insufficient for the predicted consumed SOC. Therefore, the information processing apparatus 20 can distribute power appropriately to the plurality of vehicles 10, and allows the respective plurality of vehicles 10 to travel with high efficiency, even when the supply electrical energy W from the power supply facility is insufficient.

In addition, the controller 23 determines a power feeding plan for the power feeding vehicle to supply power. The controller 23 may determine parking spaces with power supply facilities in which a respective plurality of vehicles 10 that are determined to be powered are to park in the target time period. For example, the controller 23 may determine the parking spaces based on the locations of the vehicles 10 that are determined to be powered. Specifically, the controller 23 may determine the parking spaces for the plurality of vehicles 10 so that the sum of distances the plurality of vehicles 10 travel from respective departure locations to the parking spaces and/or the sum of distances the plurality of vehicles 10 travel from the parking spaces to respective destination locations are/is the shortest. Therefore, the information processing apparatus 20 can determine the power feeding plan so as to reduce electrical energy to be consumed by the vehicles 10 to move to the parking spaces. Therefore, the vehicle 10 determined as the power feeding vehicle can feed a large amount electrical energy to the vehicles 10 that are determined to be powered.

In the embodiment described above, the controller 23 does not have to acquire the supply power information. In such a configuration, the controller 23 determines, based on the vehicle information, whether each of the plurality of vehicles 10 is eligible for charging, without using the supply power information.

For example, an embodiment in which a general purpose computer functions as the information processing apparatus 20 according to the above embodiment can also be implemented. Specifically, a program in which processes for realizing the functions of the information processing apparatus 20 according to the above embodiment are written may be stored in a memory of a general purpose computer, and the program may be read and executed by a processor. Accordingly, the present disclosure can also be implemented as a program executable by a processor, or a non-transitory computer readable medium storing the program.

The invention claimed is:

1. A method performed by an information processing apparatus, the method comprising:
for each of a plurality of vehicles for which charging in a target time period has been applied for, acquiring vehicle information including predicted remaining SOC (state of charge) to be remaining at a start of the target time period and/or predicted consumed SOC to be consumed in a vehicle use period after an end of the target time period;
determining, based on the vehicle information, whether each of the plurality of vehicles is eligible for charging in the target time period;
determining a charging plan to charge a vehicle being determined to be eligible for charging, among the plurality of vehicles, in the target time period; and
acquiring supply power information including supply electrical energy to be supplied by a power supply facility for charging vehicles in the target time period,
wherein the information processing apparatus is configured to:
determine whether charging electrical energy required to bring the predicted remaining SOC of all the plurality of vehicles to a predetermined charged state is less than or equal to the supply electrical energy; and
determine all the plurality of vehicles to be eligible for charging when it is determined that the charging electrical energy is less than or equal to the supply electrical energy, and
wherein the supply electrical energy is a sum of commercial supply electrical energy to be supplied by a commercial power source, predicted electrical energy predicted to be supplied by a renewable energy source, and storage battery supply electrical energy to be supplied by a storage battery, each of which is multiplied by a coefficient.

2. A method, performed by an information processing apparatus, the method comprising:
for each of a plurality of vehicles for which charging in a target time period has been applied for, acquiring vehicle information including predicted remaining SOC (state of charge) to be remaining at a start of the target time period and/or predicted consumed SOC to be consumed in a vehicle use period after an end of the target time period;
determining, based on the vehicle information, whether each of the plurality of vehicles is eligible for charging in the target time period; and
determining a charging plan to charge a vehicle being determined to be eligible for charging, among the plurality of vehicles, in the target time period,
wherein the information processing apparatus is configured to:
determine a vehicle whose predicted consumed SOC is greater than or equal to a first threshold, among the plurality of vehicles, as a first candidate for charging;
determine a vehicle whose value subtracting the predicted consumed SOC from the predicted remaining SOC is less than a second threshold, among the first candidate, as a second candidate for charging, when a predetermined condition based on at least the predicted remaining SOC of the vehicle as the first candidate is satisfied; and
determine a vehicle whose time between a predetermined time in the target time period and a start time of the vehicle use period is less than a third threshold, among the second candidate, as a third candidate for charging, when a predetermined condition based on at least the predicted remaining SOC of the vehicle as the second candidate is satisfied.

3. A method performed by an information processing apparatus, the method comprising:
for each of a plurality of vehicles for which charging in a target time period has been applied for, acquiring vehicle information including predicted remaining SOC (state of charge) to be remaining at a start of the target time period and/or predicted consumed SOC to be consumed in a vehicle use period after an end of the target time period;
determining, based on the vehicle information, whether each of the plurality of vehicles is eligible for charging in the target time period;
determining a charging plan to charge a vehicle being determined to be eligible for charging, among the plurality of vehicles, in the target time period;
acquiring supply power information including supply electrical energy to be supplied by a power supply facility for charging vehicles in the target time period;
determining whether charging electrical energy required to bring the predicted remaining SOC of all the plurality of vehicles to a predetermined charged state is less than or equal to the supply electrical energy; and when it is determined that the charging electrical energy is greater than the supply electrical energy, determining a vehicle whose value subtracting the predicted consumed SOC from the predicted remaining SOC is greater than a reference value, among vehicles having not been determined to be eligible for charging, as a power feeding vehicle, wherein the information processing apparatus is configured to determine a power feeding plan for the power feeding vehicle to feed power.

* * * * *